Patented Feb. 25, 1930

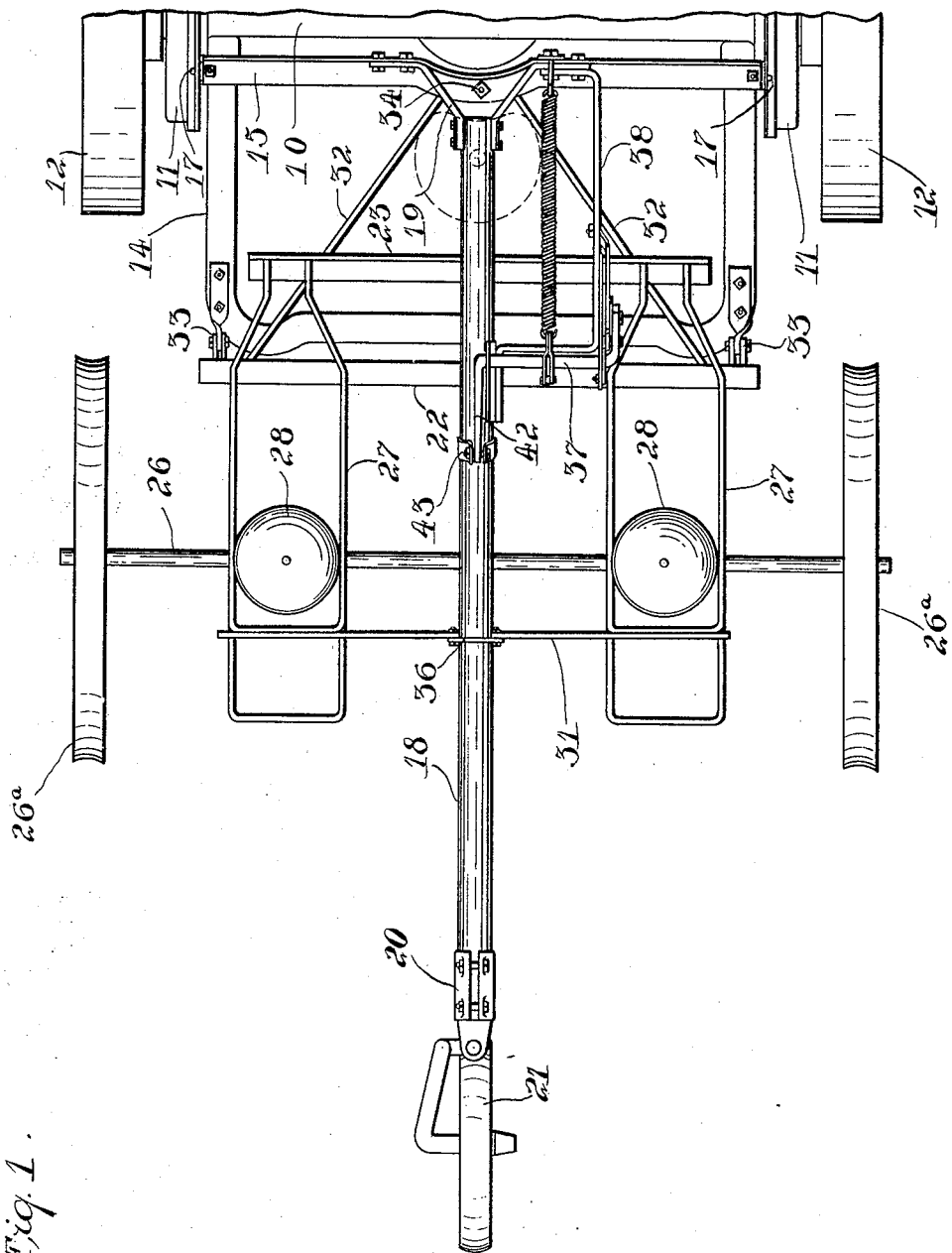

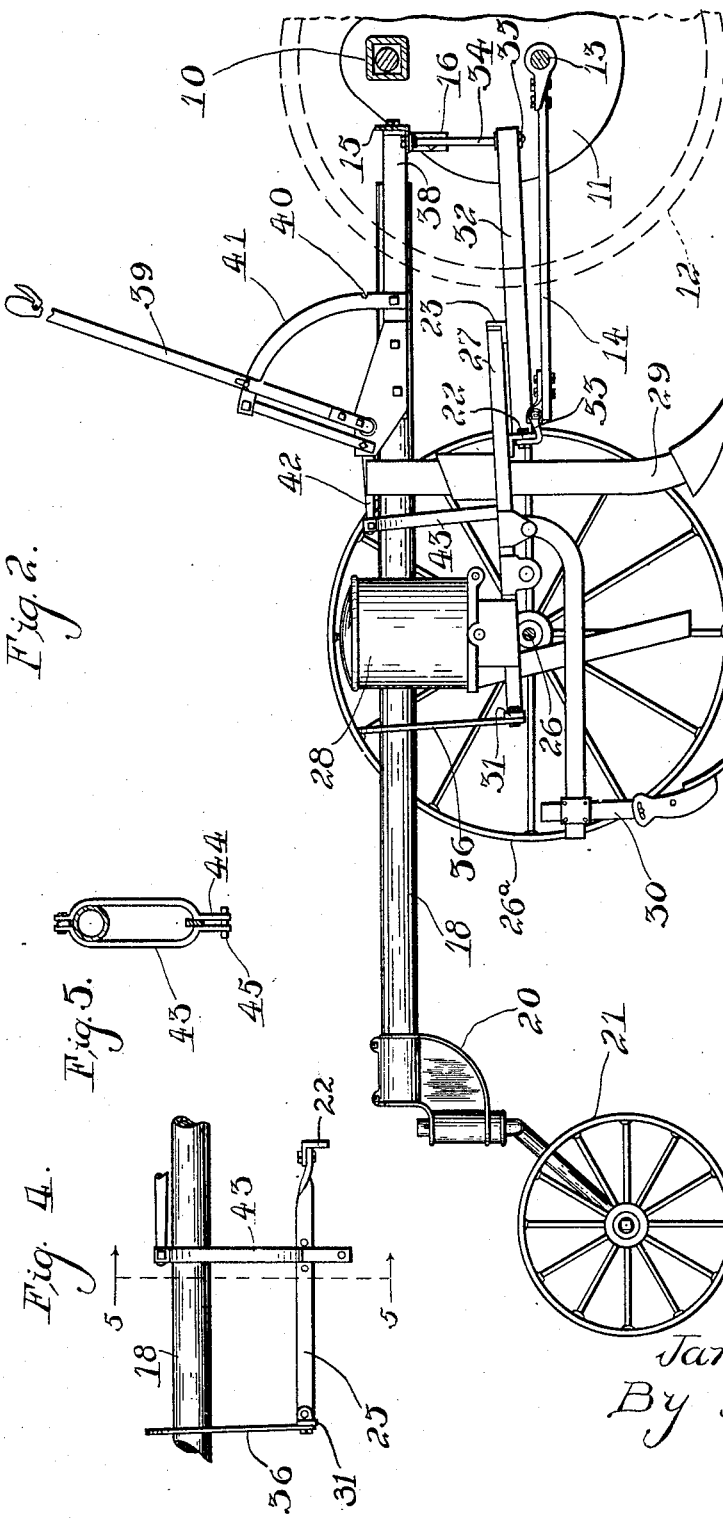

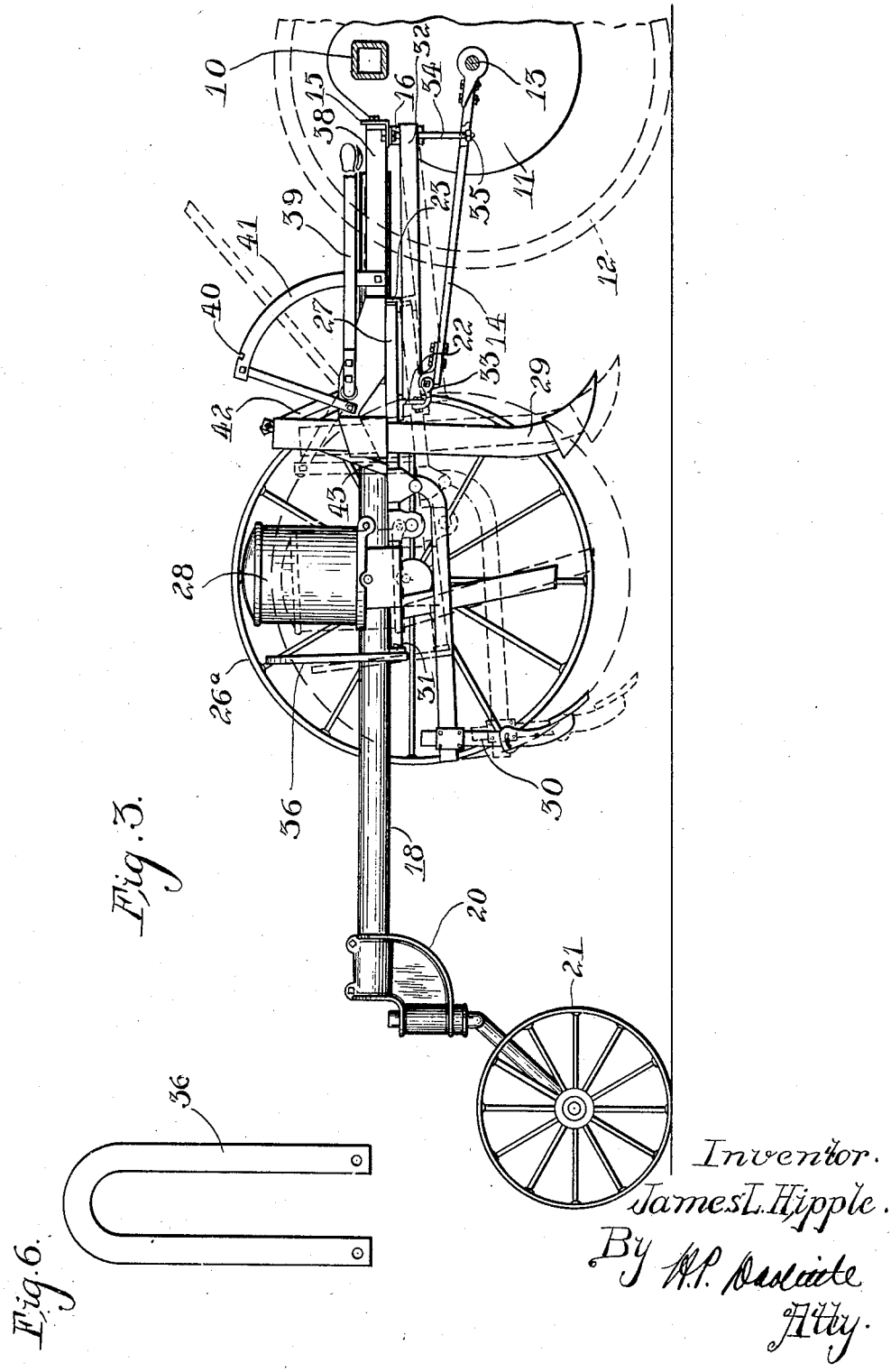

1,748,418

UNITED STATES PATENT OFFICE

JAMES L. HIPPLE, OF CANTON, ILLINOIS, ASSIGNOR TO INTERNATIONAL HARVESTER COMPANY, A CORPORATION OF NEW JERSEY

TRACTOR ATTACHMENT

Application filed November 26, 1926. Serial No. 150,660.

This invention relates to means for attaching agricultural implements to tractors, and more particularly to a novel manner of adapting a standard type of planter, or similar implement, for operation in combination with a tractor.

The main object of the invention is to provide a structure that will permit a two-row planter to be combined with the rear end of a tractor of the wide tread type in such a way as to bring it close up to the operator's station on the rear axle structure of the tractor and place its control means within easy reach thereof.

Another object is to connect the planter and tractor in such a way as to prevent any lateral swing of the planter while permitting it to have free movement vertically during travel.

Still another object is to provide an attachment embodying means for bodily lifting and lowering the planter to bring it out of and into operation.

The above objects, as well as other minor objects and advantages, are attained by providing a novel form of supplemental carrying frame extending rearwardly from the rear axle structure of a draft vehicle or tractor at such an elevation as to permit a wheel supported planter, or similar implement, to be located under it and hitched to the tractor drawbar in a novel manner, the carrying frame being provided with means for lifting the planter from the ground including a control element operable from the operator's station on the tractor, all as hereinafter more particularly described.

In the accompanying drawings,—

Figure 1 is a plan view showing the carrying frame and planter in position on the rear axle structure of a tractor;

Figure 2 is a similar side view with the planter shown in operating position;

Figure 3 is a view similar to Figure 2, but showing the planter in raised position and indicating, in dotted lines, an intermediate position of the planter assumed during raising and lowering thereof;

Figure 4 is a detail side view of certain connections between the planter and carrying frame;

Figure 5 is a detail section on the line 5—5 of Figure 4; and

Figure 6 is an enlarged detail view of a guide link connecting the carrying frame and planter.

In one preferred form of the invention which will herein be disclosed, there is employed a draft vehicle or tractor having a rear axle structure comprising an elevated transverse housing 10 having depending housings 11 fixed to it at each end on the outer sides of which are journaled the traction wheels 12, the whole forming an upwardly arched structure adapted to span two plant rows. On the inner surface of each housing 11, there is a trunnion 13. These trunnions serve as connecting elements or pivots for an arched drawbar 14 which extends rearwardly from the tractor to a point back of the traction wheels, as seen in Figure 1. This drawbar may be regarded either as belonging to the tractor or to the attachment to be described. At points above the drawbar 14, and substantially on the same horizontal plane as the housing 10, the arched axle structure carries a transverse frame bar 15 which is pivoted on a horizontal axis to the upper portions of the housings 11 by means of pivot brackets 16 fixed to its under side and having pintles 17 engaged in suitable holes in the respective housings. The bar 15 forms the front support or crosspiece for a rearwardly extending elongated frame member 18, which is secured to the center of bar 15 as by diverging connecting bars 19, the bars 15, 18 together constituting a rigid T-shaped carrying frame which is hinged on the axle structure so as to be capable of vertical movement. The rear end of member 18 has a depending bracket piece 20 fixed to it, which is formed with a vertical bearing for reception of the standard or spindle of a caster wheel support 21, the bracket and caster wheel being constructed to support the rear end of the carrying frame substantially on a level with its front connection to the tractor. An elevated carrying frame structure is thus provided which is sufficiently high to permit wheel supported farm implements of conventional types to be located under it and connected to the draft bar 14.

In the present instance, the bar 14 is shown as having connected to it a two-row planter which may be of any preferred type having seed dispensing and planting mechanism driven from its supporting wheels. The planter shown has an axle 26, wheels 26ª, and duplicate laterally disposed frames 27, on which are carried planting units 28 cooperating with the usual furrow openers 29 and coverers 30, shown on Figure 2. The frames 27 are connected together by transverse bars 22 and 23 at the front and by a bar 31 at the rear, and the front bars support the usual converging bars 32 connected at the front and forming part of the planter draft frame. A central tie bar 25 (Figure 4) connects bars 22 and 31. In the practice of the present invention and in order to bring the planter close up to the tractor, the draft bars 32 and the forward portion of the lateral frames 27 are set forward in such manner as to overlap the drawbar 14, and the crossbar 22 of the planter frame is pivotally connected at laterally spaced points to the rear of the drawbar by suitable hinge brackets 33. The planter and tractor are, therefore, held in fixed relation as regards lateral movement. The forward end of the planter draft frame has a connection with the carrying frame through a depending draft rod 34, which has its upper end fixed to the center of crossbar 15, as seen in Figure 2. This rod is received in a suitable aperture at the connected ends of the draft bars 32 to form a vertically slidable hitch. A suitable stop, such as a nut 35 engaging screw threads on the rod 34, is provided to limit downward movement of the forward end of the planter draft frame and hold it at a proper level during operation, but upon lifting of the planter the draft frame will slide upwardly, thus causing the front end of the planter to be raised at least as high as the rear and carrying the furrow opener 29 well above the ground. Preferably, an additional slidable guiding connection is provided between the rear of the planter frame and the carrying frame, and this may consist of a bail or yoke bar 36 straddling member 18 and having its arms secured to rear bar 31 of the planter. This bar serves to guide the planter during lifting and lowering thereof and also to hold it in alinement with the tractor during operation.

The carrying frame is provided with means for bodily raising and lowering the planter, and this may consist of a crank shaft 37 (Fig. 1) journaled in suitable bearings on an angular bracket member or frame bar 38 secured to members 18 and 15 of the carrying frame and constituting part thereof. One end of shaft 37 is secured to a lever 39 (Figures 2 and 3) provided with the usual latch, which may engage in either of two notches 40 formed in the respective ends of an upright arcuate bar 41 fixed to bracket 38. The other end of shaft 37 extends rearwardly to form a crank arm 42 preferably located directly above the member 18, and the end of this arm carries a lifting link 43 (Figures 4 and 5) which preferably consists of twin bars bowed outwardly to form an elongated loop embracing member 18 and having parallel extensions 44 at the lower end for reception of tie bar 25 on the planter frame. A suitable stop 45 closes the lower end of the space between the extensions 44 and this engages bar 25 and supports the weight of the planter when the lift is operated to raise it from the ground. Both the guide link 36 and lifting link 43 are of such length as to permit the planter to rise and fall, or float, freely independently of the carrying frame when the planter is in lowered or operating position. The location of lever 39 is within convenient reach of a driver occupying the seat on the tractor, indicated in dotted lines (Figure 1), and the usual control elements (not shown) provided on a planter are also within reach, by reason of the close coupled arrangement of planter and tractor above described.

There has accordingly been provided a tractor attachment characterized by the fact that a complete farm implement, such as a planter, may be connected to a tractor so as to be rigid therewith as regards lateral movement, but freely movable with respect thereto in a vertical direction, the planter maintaining its normal position with its frame parallel to the ground during such movement, by reason of the nature of the draft connections, also by the fact that the planter may be raised bodily on a supporting frame, thus automatically throwing it out of operation by removing its wheels from the ground, and then making it possible for the combined tractor and implement to be turned as a unit due to the caster wheel support at the rear of the carrying frame.

The operation of the invention will be apparent from the foregoing description. When the lever 39 is swung forward to lift the planter, its forward end will rise first, together with drawbar 14, until the forward end of the planter frame is at the upper end of draft rod 34, as in dotted line position of Figure 3, after which the rear of planter is brought up to a level with the front and locked in raised position by engagement of the latch on lever 39 with the lower notch 40 in bar 41. Sufficient clearance to permit turning is thus obtained.

While the disclosure exemplifies the invention in its preferred form, the construction and arrangement is obviously capable of modification without departure from the invention as defined in the following claims.

What is claimed as new is:

1. The combination with a tractor having rear traction wheels and an elevated axle structure connecting the wheels, of a rigid rearwardly extending T-shaped carrying member having its crosspiece connected to the upper part of the axle structure on a horizontal pivot and its stem piece extending rearwardly on the longitudinal median line of the tractor, a caster wheel supporting the rear end of said stem piece substantially on a level with its forward connection, a planter pivotally connected to the axle structure on a horizontal axis below said carrying member and having ground engaging drive wheels, vertical guide means fixed on the planter and slidably engaging the carrying member, and means on the carrying member for bodily lifting and lowering the planter.

2. The combination with a draft vehicle having rear traction wheels, an elevated axle housing and depending side housings connecting the wheels and a horizontally extending U-shaped drawbar connected to the lower portion of said axle structure, of a rigid rearwardly extending carrying member having lateral extensions connected to the upper part of the depending housings on a horizontal pivot, a caster wheel supporting the rear end of said member substantially on a level with its forward connection, a planter horizontally pivotally connected to the drawbar and supported on ground engaging drive wheels, rigid vertical guide means slidably connecting the planter and carrying member, and means on the carrying member for bodily lifting and lowering the planter.

3. The combination with a tractor of a carrying frame extending rearwardly from the tractor and having its forward end connected thereto, a caster wheel supporting the rear end of the carrying frame, a ground engaging implement comprising a horizontal frame located under said carrying frame, a fixed guide member depending from the forward portion of the carrying frame and slidably engaged with the forward end of the implement frame, a rigid vertical guide slidably connecting the rear portion of the implement frame with the carrying frame, and means on the carrying frame for lifting and lowering the implement frame, said means being connected to the implement frame at a point between said slidable connections.

4. The combination with a tractor of a carrying member extending rearwardly from the tractor on its central median line and having its forward end connected to the tractor above its rear axle, a caster wheel supporting the rear end of the carrying member, a ground engaging implement comprising a horizontal frame located under said carrying member, a free vertically shiftable guiding connection between the forward portion of the implement frame and the carrying member, a draft connection between the tractor and the implement frame including a drawbar pivotally connected to the implement frame at a point rearwardly of said shiftable connection, a rigid vertical guide member on the rear of the implement frame slidably engaging the carrying member, and means on the carrying frame for lifting and lowering the implement frame, said means being connected to the implement frame at a point intermediate its front and rear ends.

5. The combination with the upwardly arched rear axle structure and traction wheels of a wide tread tractor, of a horizontally disposed drawbar connected to the depending branches of the arched structure below its transverse portion, a supporting member extending rearwardly from the axle structure at the center thereof and hinged at its forward end to the upper portion of the axle structure for movement in a vertical plane, a caster wheel supporting the rear end of said member, a wheel supported two-row planter connected to the drawbar and positioned under the supporting member with its wheels in tread alignment with the traction wheels, and means on the forward portion of the supporting member and connected to the planter for bodily raising and lowering the planter.

6. The combination with the upwardly arched rear axle structure and traction wheels of a wide tread tractor, of a horizontally disposed U-shaped drawbar with its arms connected to the depending branches of the arched structure below its transverse portion, a supporting member extending rearwardly from the axle structure at the center thereof and substantially on a level with its transverse portion, said member being hinged to the axle structure for vertical movement, a caster wheel supporting the rear end of said member, a wheel supported two-row planter connected to the transverse portion of the U-shaped drawbar and positioned under the supporting member with its wheels in tread alignment with the traction wheels, means on the forward portion of the supporting member and connected to the planter for bodily raising and lowering the planter, and means for preventing lateral movement of the planter with respect to the supporting member.

In testimony whereof I affix my signature.

JAMES L. HIPPLE.